US011176163B2

(12) United States Patent
Pham et al.

(10) Patent No.: US 11,176,163 B2
(45) Date of Patent: Nov. 16, 2021

(54) SYSTEM AND METHOD FOR TRANSFERRING AND SYNCHRONIZING STUDENT INFORMATION SYSTEM (SIS) DATA

(71) Applicant: CollegeNET, Inc., Portland, OR (US)

(72) Inventors: Tuan Nguyen Thanh Pham, Portland, OR (US); Jeffery Scott Sanders, Portland, OR (US); Herts Chen, Portland, OR (US); Mikhail Anatolevich Krughkov, Gresham, OR (US); Devin Christopher Sills, Portland, OR (US)

(73) Assignee: COLLEGENET, INC., Portland, OR (US)

( * ) Notice: Subject to any disclaimer, the term of this patent is extended or adjusted under 35 U.S.C. 154(b) by 675 days.

(21) Appl. No.: 15/715,926

(22) Filed: Sep. 26, 2017

(65) Prior Publication Data
US 2018/0089296 A1    Mar. 29, 2018

Related U.S. Application Data

(60) Provisional application No. 62/400,465, filed on Sep. 27, 2016.

(51) Int. Cl.
| G06F 16/00 | (2019.01) |
| G06F 16/27 | (2019.01) |
| G06F 16/22 | (2019.01) |
| G06F 16/23 | (2019.01) |
| H04L 29/08 | (2006.01) |

(52) U.S. Cl.
CPC .......... G06F 16/27 (2019.01); G06F 16/2282 (2019.01); G06F 16/2379 (2019.01); H04L 67/1095 (2013.01); H04L 67/02 (2013.01)

(58) Field of Classification Search
CPC .......... G06F 19/3418; G06F 16/24568; G06F 19/3481; G06F 16/27; G06F 19/321; G06F 3/0488; G06F 3/04883; G06F 5/06
See application file for complete search history.

(56) References Cited

U.S. PATENT DOCUMENTS

| 6,957,221 B1 | 10/2005 | Hart et al. |
| 7,293,194 B2 | 11/2007 | Kawamura et al. |
| 9,305,073 B1* | 4/2016 | Kraljevic ................ G06F 16/27 |
| 2003/0158873 A1 | 8/2003 | Sawdon et al. |

(Continued)

*Primary Examiner* — Yicun Wu
(74) *Attorney, Agent, or Firm* — Scheinberg & Associates, PC; Michael O. Scheinberg

(57) ABSTRACT

Embodiments of the present invention are directed to a two-way data transfer and synchronization system. The data transfer and synchronization system includes a provider system and a customer system. The provider system includes a web service hosted by a web server connected to a computer network and a first database. The customer system includes a client application, connected to the computer network and a second database (e.g., SIS database). The provider system cannot read data from the second database. The client application is configured to send requests to the web service and to receive HTTP responses from the web service. The responses from the web service are executed by the client application so that changes made to the second database are also made to the first database, and vice versa.

25 Claims, 5 Drawing Sheets

(56) References Cited

U.S. PATENT DOCUMENTS

| | | | |
|---|---|---|---|
| 2003/0182312 A1 | 9/2003 | Chen et al. | |
| 2005/0015407 A1 | 1/2005 | Nguyen et al. | |
| 2010/0047758 A1* | 2/2010 | McCurry | G09B 7/02 |
| | | | 434/353 |
| 2011/0099148 A1 | 4/2011 | Bruning | |
| 2011/0106789 A1* | 5/2011 | Gao | G06F 16/2471 |
| | | | 707/713 |
| 2012/0084349 A1* | 4/2012 | Lee | G06Q 30/0251 |
| | | | 709/203 |
| 2012/0096521 A1 | 4/2012 | Peddada | |
| 2013/0024492 A1* | 1/2013 | Graff | G09B 7/00 |
| | | | 709/202 |
| 2013/0198386 A1* | 8/2013 | Srikanth | G06F 9/5061 |
| | | | 709/226 |
| 2014/0089526 A1* | 3/2014 | Schmidt | H04L 12/6418 |
| | | | 709/249 |
| 2014/0297409 A1* | 10/2014 | Puckett | G06Q 30/0269 |
| | | | 705/14.53 |

* cited by examiner

SYSTEM AND METHOD FOR TRANSFERRING AND SYNCHRONIZING STUDENT INFORMATION SYSTEM (SIS) DATA

This application claims priority from U.S. Prov. App. No. 62/400,465, filed Sep. 27, 2016, which is hereby incorporated by reference.

TECHNICAL FIELD OF THE INVENTION

The present invention relates to data transfer and synchronization systems, and in particular to systems for transferring data and providing other web services between a student information system (SIS) database and software-as-a-service ("SaaS") databases located in the "cloud".

BACKGROUND OF THE INVENTION

A common use of the internet is to provide, or transfer, information stored in various information storage systems, in particular, to and from student information systems (SISs). For example, event scheduling systems, such as Series25® by CollegeNET, Inc., require access to a SIS to provide relevant information to a software-as-a-service (SaaS) database (or "destination"). Other examples include course evaluation systems such as CollegeNET's "What Do You Think?"

A first problem known in the prior art as the "initiation problem" arises from a customer's need for database security. The initiation problem is a restriction by customers that it is not permissible for the customers' servers to be directly-controlled from the cloud environment. The restriction that it is not permissible for the customers' servers to be directly-controlled from the cloud environment is termed the "action initiation problem" and is nearly-universal, preventing cloud servers (such as any server off-site from the customer's servers and thus considered less "secure" by the customer) from being able to initiate any actions on the customer's servers. This is basically an interfacing asymmetry between the customer's local SIS databases and the cloud-based servers: requests for actions may pass only from the SIS database to the cloud-based server, but never in the direction from the cloud-based server back to the SIS database. However, in some cases it is necessary that some means for functionally (but not actually) circumventing this interfacing asymmetry without violating the understandable security concerns of the customer for the integrity of their SIS data.

A second problem known in the prior art is called the "intermediary problem", which relates to the complex and slow methods of the prior art for interfacing processes between a data source and a destination database to which the data is to be transferred. In a typical data interface, the data transfer process involves multiple steps: 1) the extraction of the desired data from the source, 2) placing the data into an intermediary form (e.g., vCal calendar files), and then 3) moving the intermediary files into the destination environment, where a complex process of storing, parsing, and uploading of the data into the destination database is performed. The same process is performed when transferring the data from the destination database to the source database. Such a complex transfer and data conversion process raises issues of speed, reliability, data integrity, and software maintenance.

A third problem known in the prior art as the "historical problem" arises from tracking changes in databases. The historical problem relates to the fact that the data in essentially all databases constantly undergoes changes, such as deletions, additions, or updates. Thus, for example if an interface runs a particular Structured Query Language (SQL) statement every minute to extract a data element meeting specific criteria from the source database, that SQL data pull operation will not be able to take into account the fact that a particular data element in the database may have been deleted from the database during the minute since the SQL select statement was last executed. Thus the SQL command will not be able to extract the desired data, but will have no means to correct for this situation.

Thus it would be desirable to configure a SaaS-oriented two-way data transfer interface to solve the initiation problem, avoiding the problem of asymmetrical control between customers' information systems (such as SISs) and cloud-based servers.

It would be further desirable to configure a SaaS-oriented two-way data transfer interface to solve the intermediary problem, avoiding the disadvantages of prior art data transfer systems with respect to speed, reliability, data integrity, and software maintenance.

It would be still more desirable to configure a SaaS-oriented two-way data transfer interface to solve the historical problem, avoiding problems caused by frequent deletions, additions, and updates to rows of the database (such as a SIS database).

It would also be desirable to configure a SaaS-oriented two-way data transfer interface to solve the both the initiation problem and the intermediary problem, or to solve both the initiation problem and the historical problem, or to solve both the intermediary problem and the historical problem.

In a SaaS-oriented two-way data transfer interface it would be highly desirable to solve the initiation problem, the intermediary problem and the historical problem.

SUMMARY OF THE INVENTION

Embodiments of the present invention are directed to a data transfer system between two databases. The data transfer system includes a provider system and a customer system. The provider system includes a web service hosted by a web server connected to a computer network and a first database (e.g., SaaS database). The customer system includes a client application, connected to the computer network and a second database (e.g., SIS database). The provider system cannot read data from the second database. The client application is configured to send requests to the web service and to receive HTTP responses from the web service. The responses from the web service are executed by the client application so that changes made to the second database are also synchronized to the first database.

Embodiments of the present invention are directed to a data transfer and synchronization method. The data transfer method includes configuring a data transfer system as described above; sending an HTTP request from the client application to determine whether the web service has received any data processing tasks for the second database; in response to the web service having received a data processing task for the second database, sending an HTTP response from the web service to the client application, the HTTP response further comprising work instructions for performing the data processing task on the second database; executing, using the client application, the data processing task on the second database; transmitting, using the client application, a result of the data processing task to the web service of the provider system; and modifying data in the first database of the provider system with the result of the data processing task performed on the second database of the customer system.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

Figure 1:
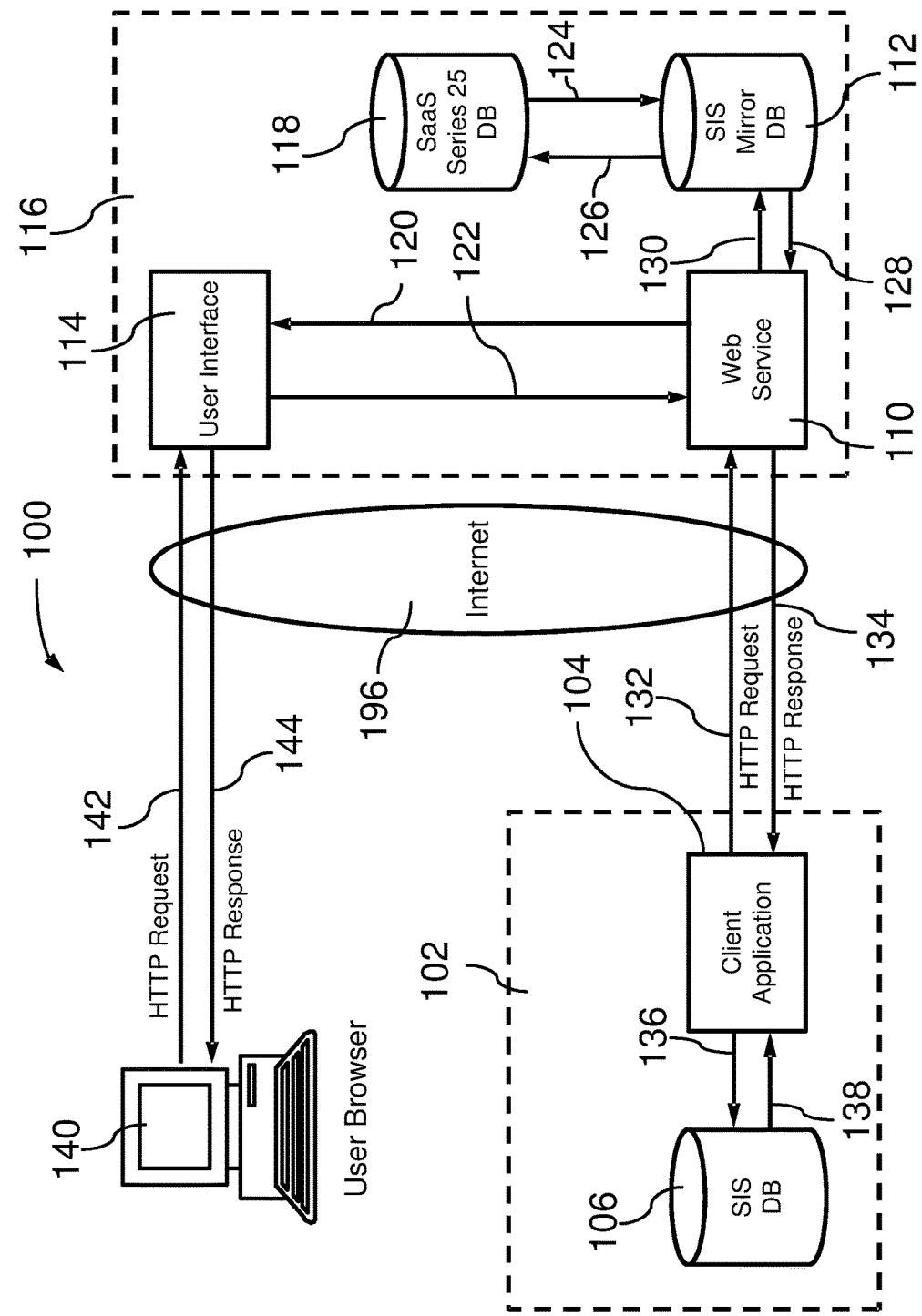
FIG. 1 shows a schematic diagram 100 of an embodiment of the present invention.

Embodiments of the invention are directed to a SaaS-oriented two-way interface which addresses the three problems discussed in the background: the initiation problem, the intermediary problem, and the historical problem. The SaaS-oriented two-way interface functions as a central gateway linking different software services requiring access to SIS data. Various embodiments may address any one, any combination of two, or all three of these problems simultaneously.

Some embodiments of the invention address the initiation problem by means of a client application which is resident on the customer's system. The client application is allowed to record, retrieve, and post data to the cloud web services. The "initiation" problem is circumvented by means of a periodic "pinging" procedure in which the client application regularly "pings" (i.e., sends a message through the internet to) the provider system to see if there are any instructions awaiting execution by the client application. When a user (through an initiated process—see below) indicates that the user would like the client application to take an action (by means of a command transmitted through the internet to the web-based servers)—this request for action creates a "flag" on the web services, which is then seen by the client application resident on the customer's system. Once this flag is detected, the client application will then initiate actions locally at the customer's system. Thus, these actions are effectively initiated from the cloud according to the user's request, however the timing and authorization for data access is still initiated at the customer's system (by the client application), consistent with the client's security needs.

Some embodiments of the invention address the intermediary problem by avoiding the idea of processing the intermediary data at the source. Instead, the client application tracks changes to the database tables at the data source on the customer's system by setting up database "triggers" and keeping "mirror tables" in the source database. These mirror tables contain a row of data for every Insert, Update, or Delete to the tables being monitored in the local database. These mirror tables are regularly cleaned up to minimize the local impact. The tracked rows are packaged up and posted to the cloud-based servers in chunks which are configurable and have controllable sizes. Once these chunks are received by the provider's cloud-based web services, the data is reconstructed into its original format and inserted to the mirror tables in the mirror database. This constant updating of the mirror tables means that at both the data source and the data destination, the tables are kept reliably in sync, so that any changes to the data at the source correspondingly affects the data at the destination in an identical way. That is the reason for the designation "mirror tables"—because these tables enable the data at the destination to "mirror" the original (changing) data at the data source. However, this mirrored data is at the cloud-based servers of the provider's system, instead of on the servers of the customer's system. Thus, various ETL (extract, transform, and load) operations on the data may be performed as if they were being performed on the local servers of the customer's system. Further data processing to the destination database (e.g., importing of academic events into the SaaS Series25 scheduling and resource management system of the assignee of the present invention) may be performed, but in a much faster, more reliable, and scalable way. Similarly but in the opposite direction, data processing from the destination to the source database may be performed on the mirror database of the provider system first before being transferred to the source database.

Some embodiments of the invention address the historical problem by the use of the same "mirror tables" applied to the solution of the intermediary problem, above. By tracking every adjustment to every row in a given data table (new rows, updates of rows, deletions of rows), it is possible to always know which data has been deleted from the table, to avoid the problems discussed in the Background section with the periodic execution of SQL commands. An additional advantage of storing all the changes to the data table is that this table of changes may serve to document the historical changes to the data over time—this can then serve as a historical "data view" which is easily accessible for time-based analytics, provenance analytics, recovery of lost data, etc.

FIG. 1 shows a schematic diagram 100 of an embodiment of the present invention. Two different processes are illustrated: an initiated process, and an automated process. These two processes operate in parallel and asynchronously to each other. Three main elements are shown: 1) a user browser 140, typically running on a personal computer, tablet computer, smartphone, etc., 2) the provider system 116, and 3) the customer system 102 (including local client application 104 originally supplied to the customer by the provider). All interactions between the user browser 140 and the provider system 116 are through a computer network, preferably the internet 196, as shown by means of secure HTTP requests 142 and responses 144. Similarly, all interactions between the provider system 116 and the client application 104 (resident on the customer system 102) are also through a computer network, preferably the internet 196 and by means of secure HTTP requests 132 and responses 134. There are no connections or communications of any type directly between the user browser 140 and the customer system 102 or client application 104. The following sections describe the two types of processes: initiated and automated in more detail.

Figure 2:
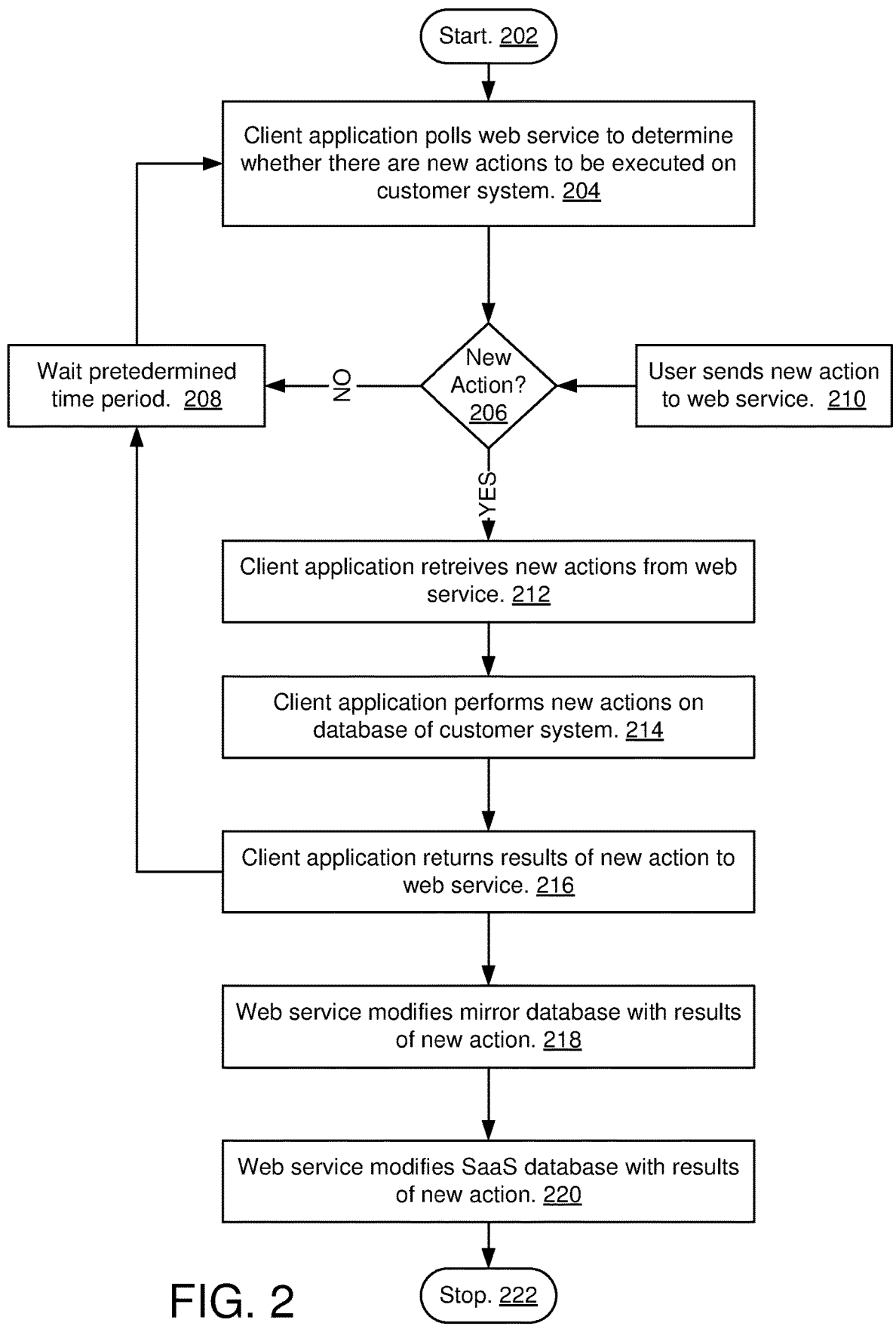
FIG. 2 shows a flowchart depicting an exemplary method of the initiated process.

FIG. 2 shows a flowchart depicting an exemplary method of the initiated process. Initiated processes correspond to requests by a user, entered through a user browser 140, for the interface to perform a particular data management or accessing task, such as initializing data of a set of terms, fetching log files, etc. This is shown in FIG. 2 as step 210. Thus the term "initiation" corresponds to the manual entry of a request by a user which is transmitted by a hypertext transfer protocol (HTTP) message 142 through the internet 196 to the user interface (UI) 114 within the provider system 116. Next, this request from the user browser 140 is sent 122 to a service-oriented architecture web service 110 of the provider, which "raises a flag" indicating that the user has requested a data processing function to be performed by the customer system 102. Note that, consistent with the requirements causing the "initiation problem," no command is sent directly to the customer system 102 to perform any actions requested from the user browser 140.

At step 204, the client application 104 (which can be implemented as a "Java" client or a clients based on another programming language) polls 132 the web service 110 (which can be a CollegeNET Series25 web service for illustrative purposes only—other web services fall within the scope of the present invention) to determine (step 206) whether any users have posted any actions (step 210) to be executed by the customer system 102 on data in the SIS database 106. If a flag as not been set, the process proceeds to step 208, where the client application 104 waits for a predetermined period of time to poll the web service again at step 204. In this way, step 204 is periodically performed by the client application 104 without any input from the provider system 116.

If any flags have been set, the flags are detected at step 206 and the process moves to step 212. At step 212, the client application 104 will download 134 the associated work instructions. At step 214, the client application 104 performs the work instructions on the customer system 102. Such instructions may comprise requested changes to the data stored in the SIS database 106, through command 136, and response 138, or the posting of data to the web service 110. Note that because the client application 104 is locally resident within the customer system 102, the client application 104 is "trusted" to perform data accessing and manipulation functions on the SIS database 106 that are not allowed to be performed directly from the provider system 116 through the internet 196 due to the security concerns underlying the "initiation problem" discussed in the Background section above.

At step 216, after the flagged data operation from the user browser 140 has been executed, the client application 104 returns the result of the flagged data operation to the web service 110 and returns to step 208 so that the process performed by the client application 104 operates in a periodic loop. A message (which may contain accessed data, or a confirmation that a data modification operation has been completed, etc.) 120 can also be sent to the user interface 114, and subsequently relayed by HTTP response 144 back to the user browser 140, thereby completing the initiated process.

At step 218, the web service 110 modifies the mirror database 112 with the result of the data operation, if necessary. At step 220, the web service 110 modifies the SaaS database with the result of the data operation, if necessary. In parallel and asynchronously with various types of initiated processes from one or more user browsers 140, automated processes keep the customer's local SIS database 106 and the corresponding mirror database 112 (located within the provider system 116 in the "cloud") synchronized automatically. By this method, both the "intermediary" and "historical" problems are addressed by some embodiments of the present invention.

Figure 3:
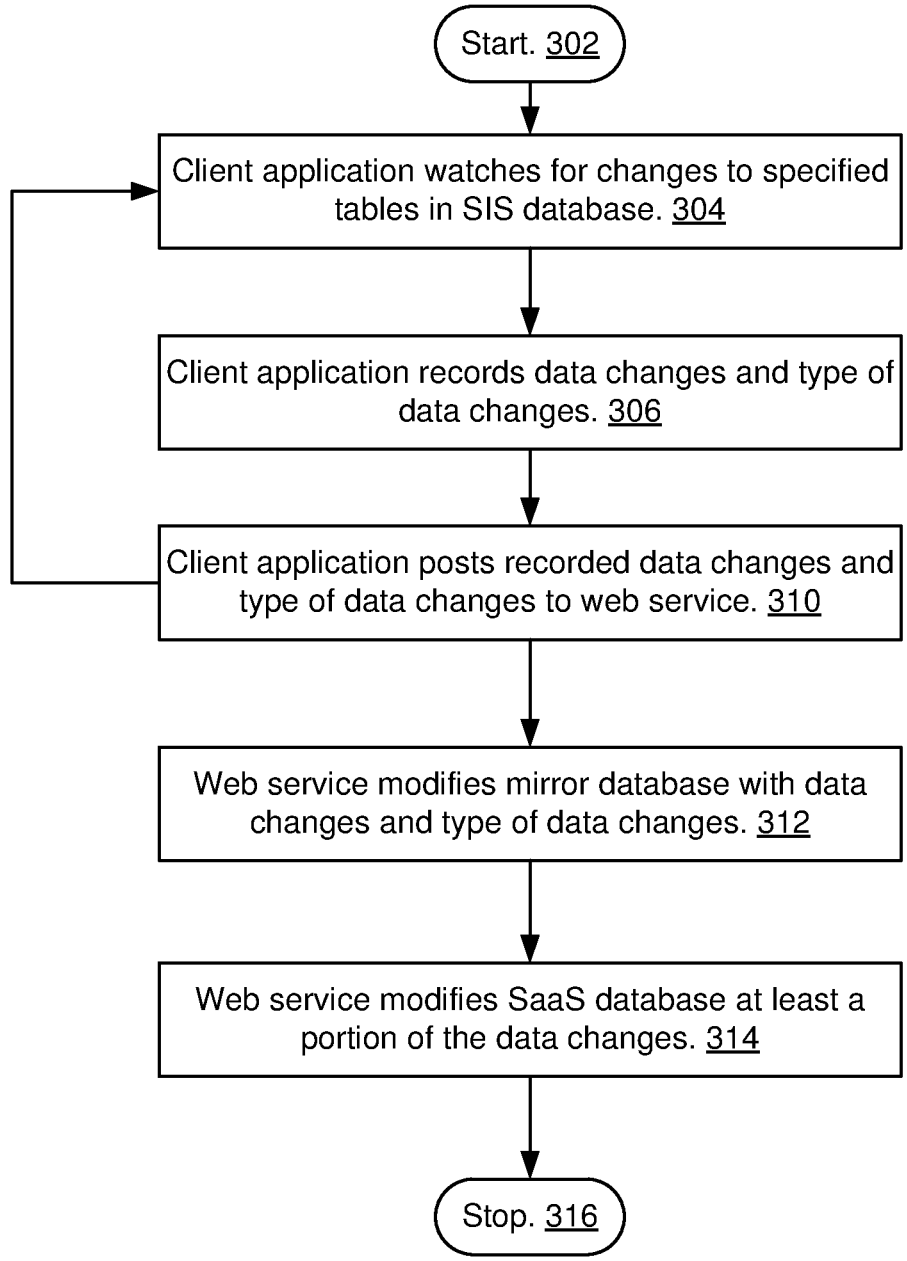
FIG. 3 shows a flowchart depicting an exemplary method of the automated (or data synchronization) process.

In addition to the periodic polling function described above for the client application 104 as part of the initiated processes, the client application 104 can also perform an automated process. FIG. 3 shows a flowchart depicting an exemplary method of the automated process. The automated process starts at 302. At step 304, the client application 104 watches for relevant changes to specified SIS tables via the triggers and mirror tables in the SIS database 106. At step 306, the client application 110 records any data changes, as well as a description of the type of data change (e.g., Insert, Update, or Delete). At step 310, the client application posts the recorded changed data and type description to the web service 110 of the provider system 116 in the "cloud" and the client application 104 returns to step 304. While the flowchart shows these as discrete steps for purpose of illustration, the monitoring and recording of data changes in the SIS database 106 is preferably performed continuously so that no relevant data changes are unrecorded. Step 310 can be performed after a predetermined interval, such as an expiration of a period of time or the recorded data changes exceeding size threshold, so as to limit the load the client application 104 places on the customer system 102.

After the web service 110 receives the posted data at step 310, the posted data is loaded 130 into the SIS mirror database 112 at step 312. The SIS mirror database 112 maintains a record of all data changes in the SIS database 106 that are relevant to the web service 110. Based on the customer configuration, at step 314, a subset of the SIS data in the SIS mirror database 112 is uploaded 126 to the SaaS database 118 (e.g. Series25® database) by means of an Extract/Transform/Load (ETL) process. Data may also be downloaded 124 from the SaaS database 118 to the SIS mirror database 112. Data may be loaded 128 from the SIS mirror database 112 to the web service 110. For example, location assignment changes made to alien events in 25Live (the CollegeNET campus-wide class and event scheduling system) can also be automatically saved 130 to the SIS mirror tables in the SIS mirror database 112. Finally, the client application 104 periodically polls the web service 110 (similarly to the polling operation described above for initiated processes) to see if there is new data. If there is new data, this data is retrieved and posted directly to the SIS database 106.

Figure 4:
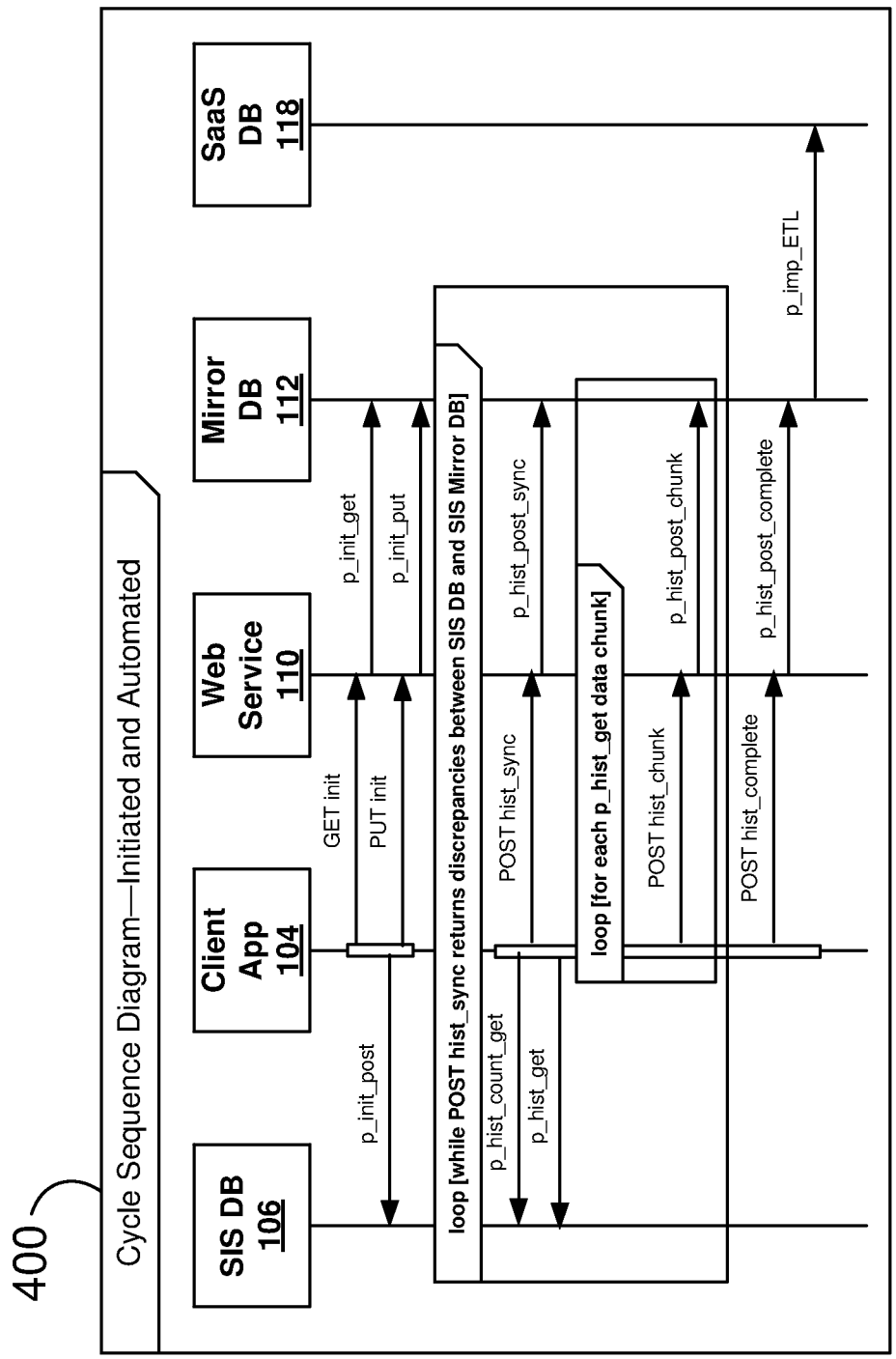
FIG. 4 shows an exemplary timing diagram 400 of the initiated processes of FIG. 2.

FIG. 4 shows an exemplary timing diagram 400 of the initiated processes of FIG. 2 described above—various actions initiated to, or from, the client application 104, the web service 110, the mirror database 112, and the SaaS database 118 are illustrated by arrows as shown. The correspondence between the SQL commands shown and the arrows in FIG. 1 can be determined by the origins and destinations of the arrows. Time increases from top to bottom.

Figure 5:
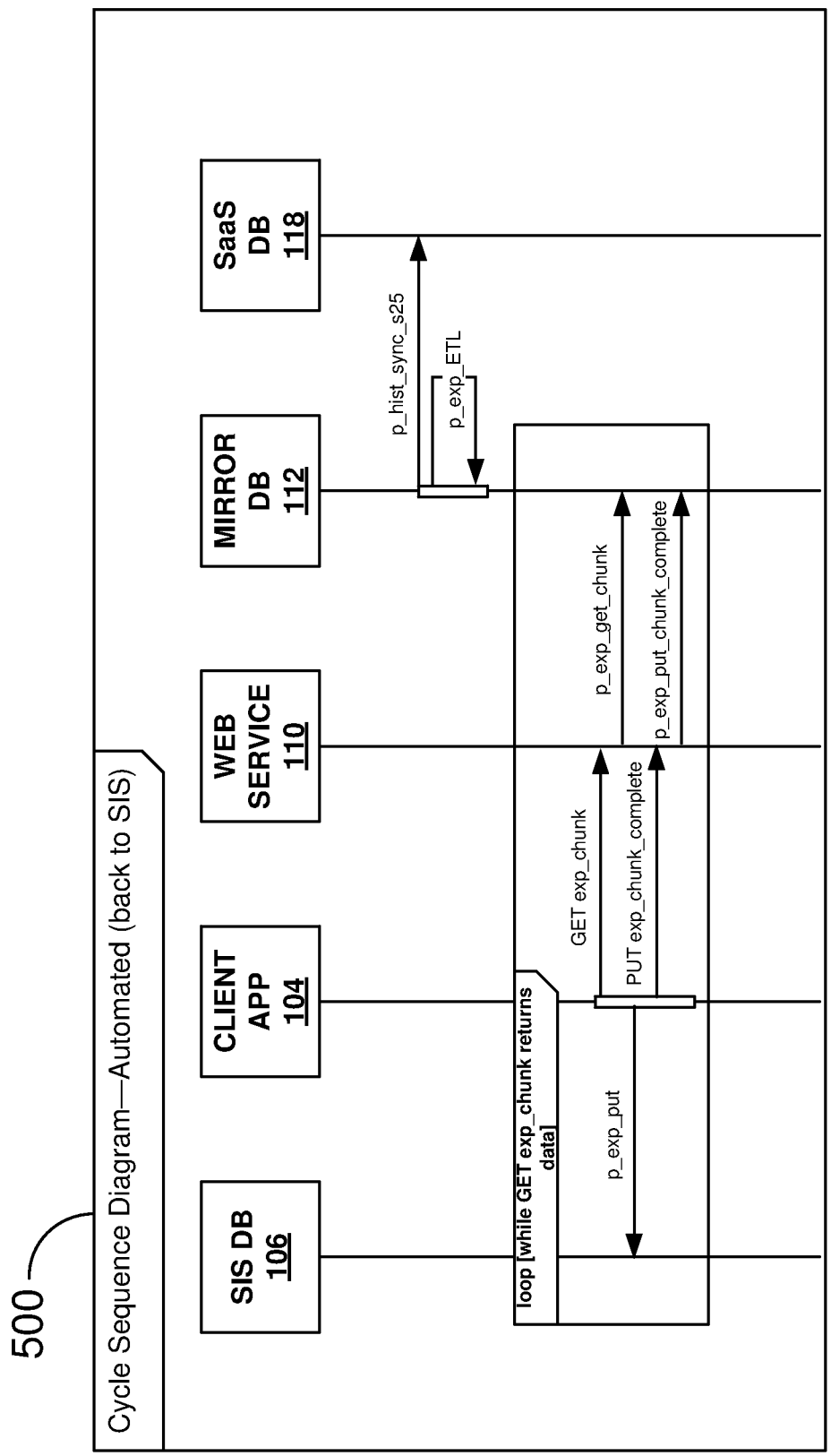
FIG. 5 shows an exemplary timing diagram 500 of the automated (or data synchronization) processes of FIG. 3.

FIG. 5 shows an exemplary timing diagram 500 of the automated processes of FIG. 3 described above—various actions initiated to, or from, the client application 104, the web service 110, the mirror database 112, and the SaaS database 118 are illustrated by arrows as shown. The correspondence between the SQL commands shown and the arrows in FIG. 1 can be determined by the origins and destinations of the arrows. Time increases from top to bottom.

Although the present invention and its advantages have been described in detail, it should be understood that various changes, substitutions and alterations can be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A data transfer and synchronization system in which a customer maintains a second database and a provider uses data from the second database to provide services to users for the customer, the system comprising:
   a provider system, comprising:
      a web service hosted by a web server connected to a computer network, the web service providing services to users for the customer; and
      a first database comprising a software-as-a-service (SaaS) database; and
   a customer system, comprising:
      a client application that is:
         locally installed on the customer system;
         trusted by the customer system to perform on the second database data accessing and manipulation functions that are not allowed to be performed directly from the provider system through the computer network;
         connected to the computer network and
         configured to send HTTP requests to the web service and to receive HTTP responses from the web service so that changes made to the second database are also made to the first database and changes made to the first database are also made to the second database; and
      the second database,
         wherein configured to send HTTP requests via the client application to the web service and to receive HTTP responses from the web service so that changes made to the second database are also made to the first database and changes made to the first database are also made to the second database; and
   ; and
   wherein the provider system cannot initiate data processing requests to the customer system to access data from the second database.

2. The data transfer and synchronization system of claim 1, in which the web service includes a user interface and further comprising a user browser configured to send an HTTP request to the user interface and to receive an HTTP response from the user interface, wherein the HTTP request from the user browser to the user interface comprises a data management or data accessing task to be performed on the data stored in the second database in the customer system.

3. The data transfer and synchronization system of claim 2, wherein the HTTP response from the user interface to the user browser comprises a result of the execution of the data management or data accessing task.

4. The data transfer and synchronization system of claim 2, wherein the data management or data accessing task to be performed on the data stored in the second database in the customer system is transmitted from the user interface to the web service.

5. The data transfer and synchronization system of claim 1, wherein the HTTP request from the client application to the web service comprises a request to determine whether any users have posted actions to be executed by the customer system on the second database.

6. The data transfer system and synchronization of claim 5, wherein the HTTP response from the web service to the client application comprises an indication of whether any users have posted actions to be executed by the customer system on the second database.

7. The data transfer and synchronization system of claim 6, wherein in the event that any users have posted an action to be executed by the customer system on the second database, the HTTP response from the web service to the client application further comprises work instructions for performing the posted action.

8. The data transfer and synchronization system of claim 7, wherein the posted action comprises reading data from the second database.

9. The data transfer and synchronization system of claim 8, wherein after the client application has executed the posted action, a result of the posted action is transmitted to the web service by means of an HTTP request.

10. The data transfer and synchronization system of claim 9, wherein the result of the posted action is transmitted from the web service to the user interface.

11. The data transfer and synchronization system of claim 10, wherein the result of the posted actions is transmitted from the user interface to the user browser by means of an HTTP response.

12. The data transfer and synchronization system of claim 1, wherein the provider system further comprises:
   a mirror database containing mirror tables;
   wherein the customer system further comprises:
      one or more mirror tables of the tables in the second database; and
      one or more triggers on the tables in the second database.

13. The data transfer and synchronization system of claim 12,
   wherein the client application watches for changes to the data stored in the second database; and
   wherein changes to the data in the second database are captured via triggers and stored in the mirror tables in the second database.

14. The data transfer and synchronization system of claim 13, wherein if the client detects a change to the data stored in the second database, then an HTTP request is sent to the web service conveying information that a change to the data has occurred, and a type of the change that has occurred to the data.

15. The data transfer and synchronization system of claim 14, wherein the types of change to the data comprise additions of data, deletions of data, or updates to the data.

16. The data transfer and synchronization system of claim 14, wherein the changes to the data stored in the second database which were sent to the web service are saved in the mirror database.

17. The data transfer and synchronization system of claim 16, wherein a portion of the relevant changes to the data are used to modify the data stored in the first database.

18. A data transfer and synchronization method, comprising the steps of:
configuring a data transfer system to comprise:
a provider system, comprising:
a web service hosted by a web server connected to a computer network; and
a first database; and
a customer system, comprising:
a client application that is:
locally installed on the customer system;
trusted by the customer system to perform on the second database data accessing and manipulation functions that are not allowed to be performed directly from the provider system through the computer network;
connected to the computer network; and
configured to send HTTP requests to the web service and to receive HTTP responses from the web service so that changes made to the second database are also made to the first database and changes made to the first database are also made to the second database; and
the second database,
wherein configured to send HTTP requests to the web service and to receive HTTP responses from the web service so that changes made to the second database are also made to the first database and changes made to the first database are also made to the second database; and the provider system cannot initiate a data processing request to the customer system to read data from the second database;
sending an HTTP request from the client application to determine whether the web service has received any data processing tasks for the second database; and
in response to the web service having received a data processing task for the second database:
sending an HTTP response from the web service to the client application, the HTTP response further comprising work instructions for performing the data processing task on the second database;
executing, using the client application, the data processing task on the second database;
transmitting, using the client application, a result of the data processing task to the web service of the provider system; and
modifying data in the first database of the provider system with the result of the data processing task performed on the second database of the customer system.

19. The data transfer and synchronization method of claim 18, wherein the provider system further comprises a mirror database containing mirror tables.

20. The data transfer and synchronization method of claim 19, wherein the client application watches for changes to the data stored in the second database of the customer system.

21. The data transfer and synchronization method of claim 20, wherein if the client detects a change to the data stored in the second database of the customer system, then an HTTP request is sent to the web service conveying information that a change to the data in the second database has occurred, and a type of the change that has occurred to the data.

22. The data transfer and synchronization method of claim 21, wherein the type of change to the data comprises additions of data, deletions of data, or updates to the data.

23. The data transfer and synchronization method of claim 21, wherein the changeto the data stored in the second database that was sent to the web service is saved in the mirror database of the provider system.

24. The data transfer and synchronization method of claim 23, wherein a portion of the changes to the data in the second database of the customer system is used to modify data stored in the first database of the provider system.

25. The data transfer and synchronization system of claim 1 in which the second database comprises a student information system (SIS) database.

* * * * *